Aug. 30, 1938.    W. B. BLAKE    2,128,738
ELECTRIC DEEP GREASE FRYER AND THE LIKE
Filed July 11, 1936    2 Sheets-Sheet 1
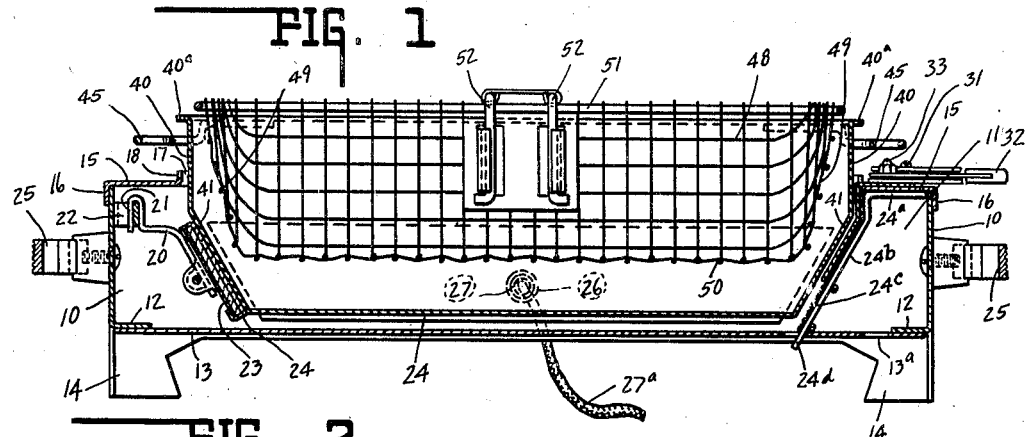
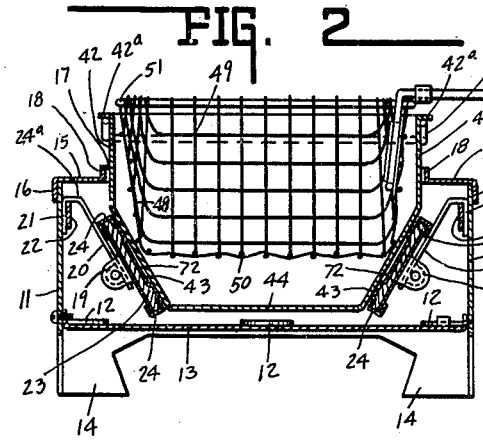
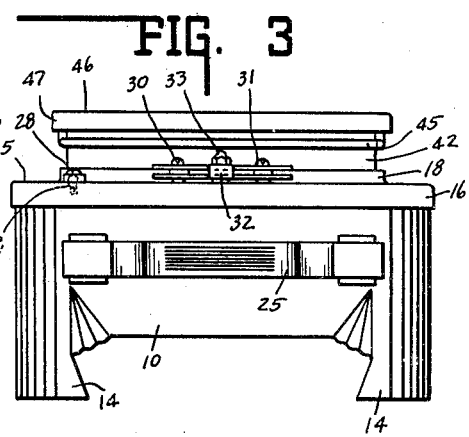
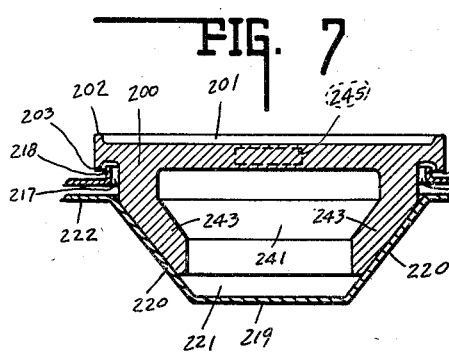
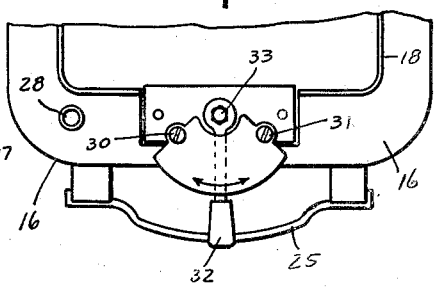
INVENTOR.
WILLIAM B. BLAKE.
BY
Lockwood Goldsmith & Galt
ATTORNEYS.

Aug. 30, 1938.　　　　W. B. BLAKE　　　　2,128,738
ELECTRIC DEEP GREASE FRYER AND THE LIKE
Filed July 11, 1936　　　2 Sheets-Sheet 2
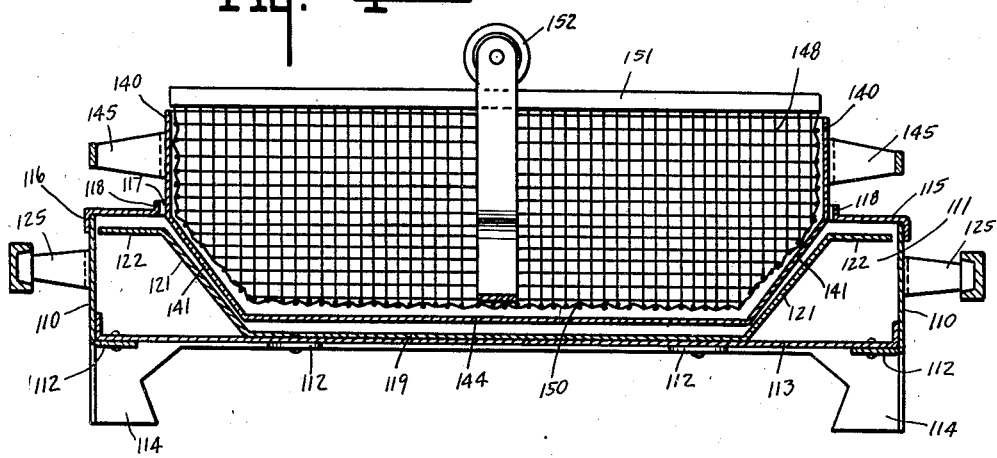
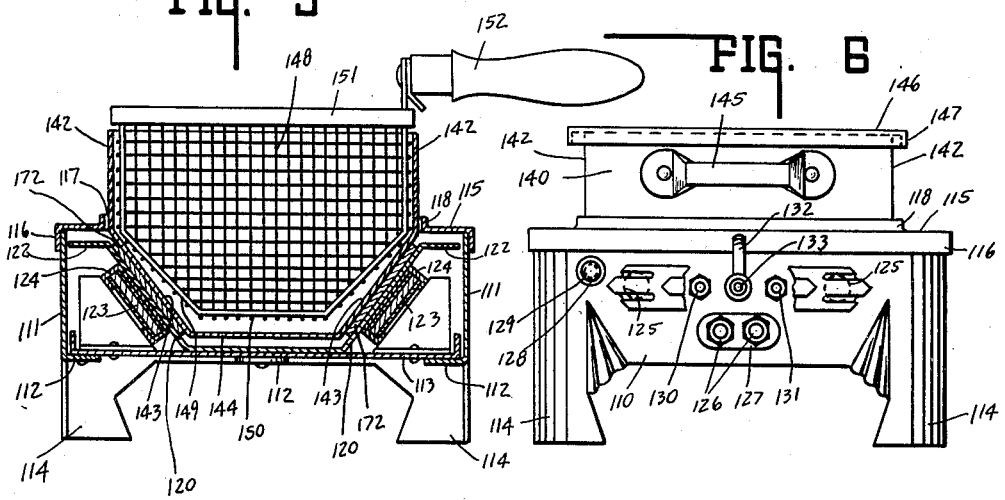
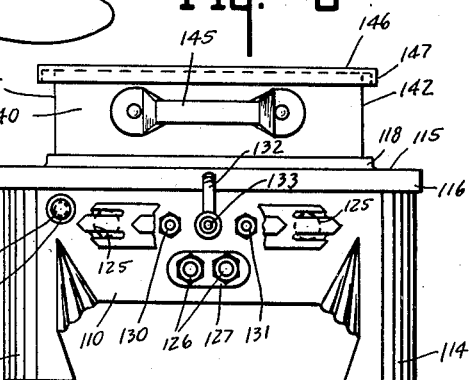
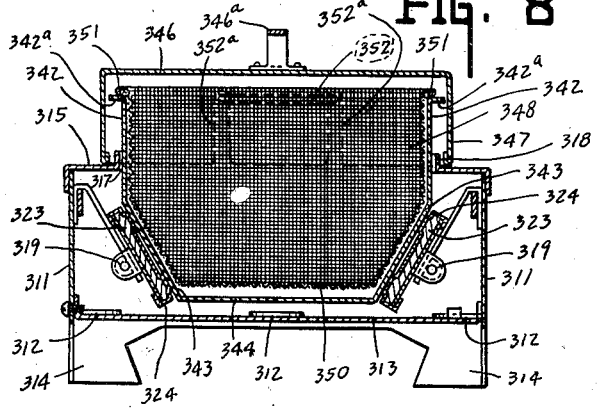
INVENTOR.
WILLIAM B. BLAKE.
BY Lockwood Goldsmith & Galt
ATTORNEYS.

Patented Aug. 30, 1938

2,128,738

UNITED STATES PATENT OFFICE 2,128,738

ELECTRIC DEEP GREASE FRYER AND THE LIKE

William B. Blake, Marion, Ind.

Application July 11, 1936, Serial No. 90,151

2 Claims. (Cl. 219—43)

This invention relates to apparatus suitable for deep grease frying and more especially to apparatus which makes practical a process of repetitious household frying without the objections heretofore attendant therewith.

This application is a continuation in part of the application, Serial No. 46,977, filed October 28, 1935, and entitled, "Electric deep grease fryer," and a part hereof is a true division of said application.

The chief object of this invention is to provide apparatus which is relatively clean and expeditious in use and which will not burn the extremely hot grease, spill the liquid grease or waste the grease, all of which heretofore has been inherent in the apparatus heretofore used for deep grease frying by the housewife.

For a better explanation of the operation and advantages of this invention, the usual household practice of deep grease frying is set forth.

Heretofore in order to clarify the grease after the fried articles are removed from it, the housewife decanted the relatively clear upper liquid grease, leaving in the original frying vessel some of the liquid grease and all of the debris which had settled to the bottom of the original frying vessel. If decantation were not carefully practiced, there resulted spilling of the hot grease, possible burning of the housewife and redistribution of the collected debris throughout the clear grease portion. Such deep grease frying, it is apparent, requires the use of two vessels in order to clarify the same.

The invention is shown exemplified by apparatus of the electrically heated character, although the grease container may be heated by other media.

One feature of the invention consists in the use of but a single container for the constant retention of the grease, said grease upon standing and cooling being of solid form. The shape of the container is such that the bottom is self sustaining and the association of the side wall arrangement is such, relative to the bottom and the source of heat, that the grease immediately at the bottom is cooler and, therefore, the included debris is relatively cooler than the main body of the grease during heating, so that charring of the debris collected in the bottom of the container does not occur, and, therefore, discoloration of the grease and resulting discoloration of the article does not occur or at least is considerably reduced.

The invention disclosed herein permits separation of the debris from the main body of the grease by stratification of the solid grease. The grease is solidified with the debris in the bottom portion. The solidified grease is removed from the container and preferably and most expeditiously by inverting the container. When inverted the upper portion of the solid grease with the included debris therein is scraped or cut off from the main body of the grease. The grease container is reapplied to the main body of clarified and solidified grease, and this leaves the grease in the container in clarified form.

This process is disclosed more fully in the co-pending application referred to.

Another feature of the invention—an extension of the apparatus disclosure—is an exemplification of means for shallow frying by the substitution of an article containing a heat transmitting element in the form of a grill.

Another feature of the invention consists in forming the grease container of such shape, as stated, that it is not only self supporting when removed from the stove or heater, but is readily and economically receivable by an ice box, mechanical refrigerator, or the like, for storage or solidification and/or clarification purposes.

Another feature of the invention consists in the apparatus suitable for deep grease frying of popcorn or the like.

Deep grease frying of the usual character requires that the grease be heated to a temperature of from 350° to 400° F. for croquettes, fritters, doughnuts, and potatoes—either French fried or chips, in the order named.

The apparatus suitable for practicing this novel process—the subject matter of the beforementioned application—includes a source of heat which is controlled thereby, permitting the desired temperature regulation.

A grease container having an inwardly and downwardly directed side wall arrangement and having the heat applied thereto, as distinguished from the bottom of the container, as was heretofore customary with household deep grease frying, permits the waste particles or debris to settle to the bottom of the container or rise to the top. In the former instance, the falling particles fall below the area of intense heat and in the latter instance, the waste particles are readily accessible for skim removal.

For successful household frying, it is necessary to eliminate as much as possible burning of the debris and this the specific form of the container accomplishes.

The container is of solid grease self-freeing type—that is, upon inversion the container is emptied of grease when the container is lifted therefrom. The grease during this operation is supported by a tray, which when the grease and container are stored in a refrigerator (ice or mechanical type) serves as a cover to prevent other articles and liquids falling therein and also as a semi-seal against the absorption of refrigerator odors.

The frying vessel or container disclosed herein also is of the storage type—that is, self sustaining—and is not tiltable and, therefore, spilling of the hot and liquid grease will not occur.

The full nature of the invention will be understood from the accompanying drawings and the following description and claims:

In the drawings, Fig. 1 is a longitudinal sectional view through one form of the invention with an included basket.

Fig. 2 is a transverse sectional view thereof.

Fig. 3 is an end elevation of the invention, the basket being omitted and the combination cover and tray being shown in cover forming position.

Fig. 4 is a longitudinal sectional view through another embodiment of the invention, and including another type of basket.

Fig. 5 is a transverse sectional view thereof.

Fig. 6 is an end elevation of this form of the invention, part being broken away to show other parts in detail, the basket being omitted and the combination cover and tray being shown in cover forming position.

Fig. 7 is a cross sectional view of the article container shown in the form of a grill and illustrated in relation to the heating well of the stove structure shown in Fig. 5.

Fig. 8 is a view similar to Fig. 2 and of a modified form of the apparatus suitable for deep grease frying of popcorn and the like.

Fig. 9 is a top plan view of the control end of the stove structure illustrating in detail the switch arrangement.

In Figs. 1 to 3 of the drawings, there is illustrated one form of the invention including a peripheral wall having ends 10, sides 11 and inwardly directed flanges or ears 12. A flanged plate 13 is suitably secured to the flanges 12 and serves as a heat baffle. Plate 13 includes apertures 13a at one end for ventilation. Legs 14 are continuations of the side and end walls and may be of ornamental character, as illustrated in Fig. 3.

Closing the frame structure is a cover plate 15 having the depending flange 16 telescopically associated with the side and end walls. The cover includes a rectangular aperture 17 defined by an upstanding collar or peripheral wall arrangement 18.

Extending longitudinally of each of the side walls and across one end wall, are elongated inclined heating elements 23 which are retained in flanged channel supports 24, each flexibly associated with the adjacent wall. Each support 24 includes the heating face 72. Each element includes a pair of ears 19 to which are secured straps 20 having ends 21 seatable in socket 22 carried by the adjacent wall.

The ends 10 are provided with handles 25 for ease of transporting the device whenever desired. One face, see Fig. 1, is provided with the usual opening 26 and nested therein is an insulation or porcelain bushing 27, which receives the extension cord 27a.

In the cover 15 is mounted a red colored translucent disc 28 behind which is mounted a small lamp bulb 29, the same being arranged for illumination when current is supplied to the heating elements 23. Positioned upon the cover 15 and projecting upwardly therefrom are two stops, 30 and 31, and positioned intermediate the same is an oscillatable switch member 32—see Figs. 3 and 9—which serves as a finger engageable switch actuating portion, the shaft 33 being connected to a thermal resistance type control switch mechanism.

When the attachment plug is inserted in the wall socket the fat fryer elements are energized and the lamp bulb is illuminated. When switch handle 32 is positioned contiguous to post 31, proper heat is generated for such operations as fritters, doughnuts, croquettes and foods having a large flour content. When switch handle 32 is contiguous to post 30, heat is generated to take care of potato chips, french fried potatoes and the like. Intermediate positioning provides for intermediate heating temperatures. The amount of switch handle movement for control purposes may be varied as desired for commercial consideration, the foregoing representing but one example.

The control mechanism and the wiring circuit have not been illustrated herein for clearness.

A screen 24c is suitably supported upon an inclined wire mesh support 24b, secured at 24d to the base 13 and extensions 24a underlie the cover 15.

The deep grease container includes two end walls 40 which have downwardly and inwardly directed extensions 41 and two side walls 42 having downwardly and inwardly directed extensions 43 and the same terminate in a flat bottom 44 of considerable area. The area of this bottom with respect to the volumetric capacity, is such that the container is self-sustaining, that is, will not tip when placed on a flat support.

The outline of the grease container is substantially rectangular and the same readily lends itself to economical reception by a refrigerator. The grease container includes the handles 45. To protect grease in the container from articles and liquids dropping therein, a rimmed cover 46 having the flange type rim 47 is provided. The container may have its upper edge flanged as at 40a and 42a.

For frying there is also provided, but this is well known in the art, a basket, which is of foraminated or reticulated character, 48 indicating generally the body portion thereof which conforms in general to the shape or interior surface of the grease container, except that the inclination of the inclined sides 49 of the basket is at a different angle so that the lower portions are more remote from the adjacent side walls than the upper portion and the bottom 50 of the basket lies in a plane above the bottom 44 of the grease container. The basket may be provided with a peripheral frame 51 at its upper edge and a suitable handle 52 is detachably associated therewith, see Figs. 1 and 2. The handle 52 permits the en masse draining of the articles by withdrawal of the basket from the grease when the articles have been fried.

Since the sides 49 and bottom 50 of the basket are in spaced relation to the inclined sides and bottom 44 of the grease container, small particles, which adhere to the articles to be fried and which become detached therefrom, and other debris particles, fall through the basket openings and settle in the bottom portion and upon the bottom of the grease container. As illustrated most clearly in Fig. 2, the heating elements 23 are located relative to the container so that the bottom 44 is not subjected to direct heat but only the side walls thereof are heated.

The heat is transmitted inwardly and upwardly from the heating elements 23 to the grease, leaving the immediately lower layer of the grease at a relatively cooler temperature than the main body of the grease, this temperature being approximately ten to twenty degrees cooler. Thus, the highly heated portion of the grease, due to the constant transmission of heat thereto, is not that portion in which the debris particles collect. The debris particles therefore, are not subject to the most intense heat and, therefore, do not char and discolor the grease or impart an unpleasant taste thereto, as ordinarily would occur if heat were applied directly to bottom 44.

It will be apparent that the grease container is nestable in the well structure of the heating apparatus formed by the heating elements 23 and portions 24a and 24c. The basket is also nestable in the grease container when grease is not included therein in solid form or when the grease is included therein in liquid form if desired.

To facilitate more rapid heating of the grease to frying temperature, the cover 46 may be applied to the container during the preliminary heating. Then after the unfried articles are placed in the basket, the basket is lowered and nested in the container and the cover, if desired, may be superimposed upon the basket.

When the articles are fried, the basket is elevated, held above the grease container and slightly shaken to free the articles of trapped grease which drains from the basket back into the container. The entire heating apparatus and container may then be moved to any point for subsequent handling. To protect the liquid grease from articles falling therein, the cover may be applied to the container.

It will be noted there is a possibility of grease, in the draining of the same from the fried articles, dropping down upon the frame cover 15. Should that occur, the collar 18 thereon prevents this grease running into the interior of the heating apparatus through opening 17.

After standing sufficiently long for the grease to substantially solidify, the grease container with the cover thereon may be lifted out of the well and placed in the refrigerator for storage until frying is to again take place and/or it is desired to clarify the grease, as set forth in the copending application noted hereinbefore.

When frying is to take place, the container is replaced in the well, the extension cord 27a connected to a suitable source of energy and the switch handle 32 is moved to the desired position, as previously set forth. When the grease is hot enough, which may be ascertained by trying it in the usual manner, articles such as potatoes, and the like, are placed in the basket and the basket with the articles therein, is inserted in the container. If, however, the articles are of doughnut formation, such as fritters, the basket is placed in the grease prior to article reception and then the fritter dough is deposited in the grease so that upon completion of the frying, removal of the basket simultaneously removes the fried fritters, doughnuts, crullers, and the like.

Repeated fryings will naturally cause the accumulation of much debris in the bottom of the container. To clarify the same, the process set forth in the copending application may be practiced.

In Figs. 4 to 6 of the drawings, there is illustrated another form of the invention including a peripheral wall having ends 110 and side 111 with inwardly directed flanges or ears 112. A flanged plate 113 is suitably secured to the flanges 112 and serves as a heat baffle. There are also provided legs 114 which are continuations of the side and end walls and these may be of ornamental character, as illustrated in Fig. 6.

Closing the frame structure is a cover plate 115 having the depending flange 116 telescopically associated with the side and end walls and the cover includes a rectangular aperture 117 defined by an upstanding collar or peripheral wall arrangement 118.

Positioned within the chamber casing is a supporting well arrangement including the bottom 119, the upwardly and outwardly directed inclined side walls 120 as well as the upwardly and outwardly directed inclined end walls 121 and said walls terminate in a peripherally and outwardly directed plate portion 122. The upper end of the well is in substantial registration with the aperture 117.

Extending longitudinally of each of the inclined side walls, in the present instance, and not across the end walls, although the same may be similarly provided, is an elongated heating element 123 which is retained in a flanged channel support 124 rigid with the well side wall 120. These elements may be connected in series or in multiple, as is well known in the electrical heating art. The fore and back ends 110 are provided with handles 125 for ease of transporting the device whenever desired. The fore face 110 is provided with the usual terminals 126 and the face includes an aperture 127 adapted to nestingly receive the installation part of a female type extension cord connector, the terminals 126 being receivable therein.

Also in the fore face is mounted a red colored transparent disc 128 behind which is mounted a small lamp bulb 129, the same being arranged for illumination when current is supplied to the heating elements 123. The circuit arrangement is omitted for clearness. Positioned within the front handle and projecting from the face 110 are two stops, 130 and 131, and positioned intermediate the same is an oscillatable switch member 132 which projects above the plane of the handle—see Fig. 6—and serves as a finger engageable switch actuating portion, the shaft 133 being connected to a thermal resistance type control switch mechanism. When the switch handle 132 engages the post or projection 130, the heating elements are not energized and the lamp bulb is not illuminated. When the switch member 132 is moved from the post 130 toward the post 131, current supplied to terminals 126 is also supplied to the heating elements 123 and the lamp bulb is illuminated.

When the switch handle 132 is positioned as shown in Fig. 6, the same regulates the current such that it will produce sufficient heat suitable for croquette frying. When positioned about 22½° clockwise beyond that position shown, it is suitable for fritter frying, and when positioned about 45° from the position shown in Fig. 6, the temperature is suitable for doughnut and cruller frying. When the switch handle 132 engages the stop 131, the heating elements provide sufficient heat so that potatoes in chip, French fried or shoe-string form may be most satisfactorily effected.

The control mechanism and the wiring circuit have not been illustrated herein for clearness.

Of course, the amount of switch handle movement for control purposes may be varied as desired for commercial consideration, the foregoing representing but one example of the invention.

The deep grease container includes two end walls 140 which have downwardly and inwardly directed extensions 141 and two side walls 142 having downwardly and inwardly directed extensions 143 and the same terminate in a flat bottom 144 of considerable area. The area of this bottom with respect to the volumetric capacity is such that the container is self-sustaining, that is, will not tip when placed on a flat support.

The outline of the grease container is substantially rectangular and the same readily lends itself to economical reception by a refrigerator. The grease container includes the handles 145. To protect grease in the container from articles and liquids dropping therein when positioned in a refrigerator, a cover 146 having the flange or rim 147 is provided.

For frying, there is also provided a basket of foraminated or reticulated character, 148 indicating generally the body portion thereof which conforms in general to the shape or interior surface of the grease container, except that the inclination of the inclined sides 149 of the basket, is at a different angle so that the lower portions are more remote from the adjacent side walls than the upper portion and the bottom 150 of the basket lies in a plane above the bottom 144 of the grease container. The basket may be provided with a peripheral frame 151 at its upper edge and a suitable handle 152 to permit the en masse draining withdrawal of the articles from the grease when fried.

Since the bottom 150 of the basket is in spaced relation to the bottom 144 of the grease container, small particles, which initially adhere to the articles to be fried and which become detached therefrom, as well as other debris particles, fall through the basket openings and settle to the bottom portion and upon the bottom of the grease container. As illustrated most clearly in Fig. 5, the heating elements 123 are located relative to the container so that the bottom of the container is not subjected to direct heat but the side walls thereof terminate a slight distance above the bottom.

The container is provided with heat conducting plate portions 172 along the inclined sides adjacent the heating elements and these are shown terminating short of the bottom of the container. The heat is transmitted inwardly and upwardly from these elements to the grease, leaving the immediately lower layer of the grease at a relatively cooler temperature than the main body of the grease, this temperature being approximately ten to twenty-degrees cooler. Thus, the highly heated portion of the grease, due to the constant transmission of heat thereto, is not that portion into which the debris particles collect, so that the debris particles, therefore, are not subject to the intense heat and, therefore, do not char and discolor the grease or impart an unpleasant taste thereto.

It will be apparent that the grease container is nestable in the well structure of the heating apparatus and that the basket is also nestable in the grease container when grease is not included therein in solid form or when the grease is included therein in liquid form if desired.

To facilitate more rapid heating of the grease to frying temperature, the cover 146 may be applied to the container during the preliminary heating and then after the articles are placed in the basket and the basket lowered and nested in the container, the cover, if desired, may be superimposed over the basket.

After the articles have been fried, et cetera, the basket is elevated above the grease container and slightly shaken to free the articles of trapped grease. This drains into the container from the basket and the articles. The entire heating apparatus and container may then be moved to any desired location for subsequent handling. To protect the liquid grease from articles falling therein, the cover again may be applied to the container.

It will be noted there is a possibility of grease, in the draining of the same from the fried articles, dropping down upon the frame cover 15. should that occur, the collar 118 thereon prevents this grease running through opening 117 into the interior of the apparatus.

After standing sufficiently long for the grease to substantially solidify, the grease container with the cover thereon may be lifted out of the heating well and placed in the refrigerator for storage until frying is to again take place, or it is desired to clarify the grease, as set forth in the copending application before mentioned.

When frying is to take place, the container is replaced in the wall, the terminals 126 connected by the usual extension cord to a source of energy and the switch handle 132 is moved to the desired position, as previously set forth. When the grease is hot enough, which may be ascertained by trying it in the usual manner, articles such as potatoes, and the like, are placed in the basket and the basket with the articles therein, is inserted in the container. If, however, the articles are of doughnut formation, such as fritters, the basket is placed in the grease prior to article reception and then the fritter dough is dropped into the grease. Upon completion of the frying, removal of the basket simultaneously removes the fried fritters, doughnuts, crullers, and the like, or these may be removed by any straining or draining type remover.

Repeated fryings will naturally cause the accumulation of much debris in the bottom of the container. To clarify the same, the container with the cover thereon and with the grease therein in solid form is removed from the refrigerator and inverted so that the cover now serves as a tray. The process of clarification disclosed and claimed in the copending application may then be practiced.

In Fig. 7, the numeral 218 indicates the flange defining the rectangular opening 217 in the cover 215 of a heating apparatus having well defining walls 220 and 221, the bottom 219 and the plate flanged edge 222. Nestable in the well thus formed in a heating apparatus of the character before mentioned, specifically illustrated in Figs. 4 to 6, inclusive, is a griddle 200 having a frying plate surface 201, defined by the ridge or rim 202 and the same is offset laterally relative to the collar 218. Said griddle includes a downwardly and oppositely directed flange 203 which telescopically receives the collar 218. Fig. 7 illustrates the side wall portions 243 to be thicker than the griddle plate portion and the end walls 241 may be of similar character. The central opening below the griddle plate portion proper and defined by walls 243 and 241, is to insure that the griddle is relatively light. The griddle may be used with the stove shown in Figs. 1 to 3, inclusive.

The griddle also includes a handle extension 245 at each end, the same being comparable to the handles 45 or 145 on the respective grease containers. Since portion 243 is thicker than the griddle plate portion, there is insured transference of heat from the heating elements so that the griddle plate portion is substantially as hot, if not hotter, than the portions 243, due to the transference of heat from a larger cross-sectioned body to a smaller cross-sectioned body.

In Fig. 8 of the drawings is illustrated a form of the invention found most suitable for frying pop corn. Similar numerals of the three hundred series indicate similar or like parts. In this form of the invention the basket 348 is of relatively small mesh, similar to that used with hand hoppers. In this instance, cover 346 rests upon the face 315. The basket flange 351 rests upon the flange 342a at the top of wall 342 of the container. The bottom 350 is spaced from the container bottom 344. Cover 346 has a handle 346a and a depending rim 347 that is of greater outline than flange 318 so that grease on the cover will not drain into the interior of the device through opening 317. Handles 352 exteriorly positioned for elevation of the basket from the container 342—343 and 344, project through slots 352a in the cover 346, so that when popping ostensibly has ceased, the basket while covered, is elevated from the container, shaken while over same to remove the grease adhering to the mesh bottom and then the cover is removed. This cover and basket removal arrangement is provided so that if a delayed popping occurs, when the cover is removal and just prior to basket removal, scattering of the grease and possible burning of the attendant is prevented. The grease level above the basket bottom is usually about a quarter to a half inch therefrom. The kernels lie in the hot grease. The major portion of the popped corn is above the grease. Buttering is not required. Just sufficient grease film adheres to the popped corn to retain the salt thereon.

The basket handles are such that when engaged for basket and cover removal, the cover nevertheless is in basket closing position.

While the invention has been described and illustrated herein with great particular, such detailed description is to be considered as illustrative only and not restrictive in character, and furthermore, as will be evident from the recitation of the various modifications hereinbefore set forth, other modifications will readily suggest themselves to persons skilled in this art and all such modifications are considered to be within the broad scope of the invention, reference being had to the appended claims.

The invention claimed is:

1. In an electric cooker, a frame, downwardly and inwardly inclined supports in said frame around the sides thereof and mounted therein for yieldable movement independently of one another, heating elements carried by certain of said supports, a container having a flat bottom with outwardly inclined side walls rising therefrom, said walls disposed substantially parallel with said supports, and said container to be received within said frame with its side walls resting upon and yieldably engaged by said support.

2. In an electric cooker, a frame, straps secured at their upper ends to the walls of said frame and projecting downwardly and inwardly therefrom, supports attached to said straps and disposed parallel to the latter, the said supports capable of yielding movement within said frame independent of one another, heating elements on said supports, a container having a flat bottom with outwardly inclined side walls rising therefrom, said walls disposed substantially parallel with said supports, and said container to be received within said frame with its side walls resting upon said supports.

WILLIAM B. BLAKE.